US011148677B2

(12) United States Patent
Mukai et al.

(10) Patent No.: US 11,148,677 B2
(45) Date of Patent: Oct. 19, 2021

(54) VEHICLE, CONTROL SYSTEM OF VEHICLE, AND CONTROL METHOD OF VEHICLE

(71) Applicant: HONDA MOTOR CO., LTD., Tokyo (JP)

(72) Inventors: Takuyuki Mukai, Wako (JP); Jun Ochida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 16/894,352

(22) Filed: Jun. 5, 2020

(65) Prior Publication Data

US 2020/0298871 A1    Sep. 24, 2020

Related U.S. Application Data

(63) Continuation of application No. PCT/JP2018/043407, filed on Nov. 26, 2018.

(30) Foreign Application Priority Data

Dec. 13, 2017  (WO) .................. PCT/JP2017/044663

(51) Int. Cl.
*B60W 50/00* (2006.01)
*B60W 50/02* (2012.01)
(Continued)

(52) U.S. Cl.
CPC ...... *B60W 50/0205* (2013.01); *B60W 50/029* (2013.01); *B60W 50/045* (2013.01);
(Continued)

(58) Field of Classification Search
CPC ......... B60W 50/0205; B60W 60/0053; B60W 50/029; B60W 50/045; B60W 50/14;
(Continued)

(56) References Cited

U.S. PATENT DOCUMENTS 9,568,995 B1 * 2/2017 Lian ...................... G06T 15/20
9,758,037 B2    9/2017 Horiike et al.
(Continued)

FOREIGN PATENT DOCUMENTS

JP    2005-076831 A    3/2005
JP    2015-047967 A    3/2015
(Continued)

OTHER PUBLICATIONS

International Search Report for PCT/JP2018/043407 dated Jan. 8, 2019.

*Primary Examiner* — Ian Jen
(74) *Attorney, Agent, or Firm* — Thomas | Horstemeyer, LLP (57) ABSTRACT

A control system of a vehicle comprises first and second traveling control units configured to perform first and second traveling control of the vehicle, respectively, first and third communication units for the first and second traveling control unit to communicate with an external world recognition apparatus group, respectively, and second and fourth communication units for the first and second traveling control unit to communicate with a actuator group, respectively. The first and second traveling control units include first and second monitoring units configured to monitor a communication state of the first and third communication unit and a communication state of the second and fourth communication unit, respectively. When the first or second monitoring unit detects functional deterioration of the vehicle based on the communication states during monitoring, the first and/or second traveling control unit performs substitution control.

12 Claims, 4 Drawing Sheets

(51) Int. Cl.
*B60W 60/00* (2020.01)
*B60W 50/029* (2012.01)
*B60W 50/04* (2006.01)
*B60W 50/14* (2020.01)

(52) U.S. Cl.
CPC ........ *B60W 50/14* (2013.01); *B60W 60/0053* (2020.02); *B60W 2050/021* (2013.01); *B60W 2050/046* (2013.01); *B60W 2420/42* (2013.01); *B60W 2420/52* (2013.01)

(58) Field of Classification Search
CPC ..... B60W 2050/021; B60W 2050/046; B60W 2420/42; B60W 2420/52; B60W 2050/0072; G08G 1/16
See application file for complete search history.

(56) References Cited

U.S. PATENT DOCUMENTS

| | | | |
|---|---|---|---|
| 2016/0193917 A1 | 7/2016 | Horiike et al. | |
| 2018/0272993 A1* | 9/2018 | Johnson | B60R 25/33 |

FOREIGN PATENT DOCUMENTS

| | | |
|---|---|---|
| JP | 2017-054170 A | 3/2017 |
| JP | 2017-062172 A | 3/2017 |
| JP | 2017-111527 A | 6/2017 |
| WO | 2016-080452 A1 | 5/2016 |
| WO | 2019/116870 A1 | 6/2019 |

* cited by examiner

VEHICLE, CONTROL SYSTEM OF VEHICLE, AND CONTROL METHOD OF VEHICLE

CROSS-REFERENCE TO RELATED APPLICATION(S)

This application is a continuation of International Patent Application No. PCT/JP2018/043407 filed on Nov. 26, 2018, which claims priority to and the benefit of International Patent Application No. PCT/JP2017/044663 filed on Dec. 13, 2017, the entire disclosures of which are incorporated herein by reference.

TECHNICAL FIELD

The present invention relates to a vehicle, a control system of the vehicle, and a control method of the vehicle.

BACKGROUND ART

Various technologies for achieving automated driving of a vehicle have been proposed. In PTL 1, a monitoring apparatus is provided for monitoring whether or not various kinds of control by an automated driving control apparatus is normally operating. The monitoring apparatus compares its own control calculation result with a control calculation result by the automated driving control apparatus, and when both control calculation results do not match, forcibly cancels an automatic control function by the automated driving control apparatus.

CITATION LIST

Patent Literature

PTL 1: International Publication No. 2016/080452

SUMMARY OF INVENTION

Technical Problem

Since the monitoring apparatus in PTL 1 does not control the automated driving, the configuration including the monitoring apparatus is not a sufficiently redundant configuration. Some aspects of the present invention provide a technique for improving the redundancy of a vehicle that performs automated driving.

Solution to Problem

According to some embodiments, there is provided a control system of a vehicle including an external world recognition apparatus group and an actuator group, the control system comprising: a first traveling control unit configured to perform first traveling control of the vehicle; a second traveling control unit configured to perform second traveling control of the vehicle; a first communication unit for the first traveling control unit to communicate with the external world recognition apparatus group; a second communication unit for the first traveling control unit to communicate with the actuator group; a third communication unit for the second traveling control unit to communicate with the external world recognition apparatus group; and a fourth communication unit for the second traveling control unit to communicate with the actuator group, wherein the first traveling control unit includes a first monitoring unit configured to monitor a communication state of the first communication unit and a communication state of the second communication unit, the second traveling control unit includes a second monitoring unit configured to monitor a communication state of the third communication unit and a communication state of the fourth communication unit, and when the first monitoring unit or the second monitoring unit detects functional deterioration of the vehicle based on the communication states during monitoring, at least one of the first traveling control unit and/or the second traveling control unit performs substitution control.

Advantageous Effects of Invention

According to the present invention, the redundancy of a vehicle that performs automated driving is improved.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings are included in the specification, constitute a part of the specification, illustrate embodiments of the present invention, and are used for describing the principle of the present invention together with the description of the drawings.

DESCRIPTION OF EMBODIMENTS

Figure 1:
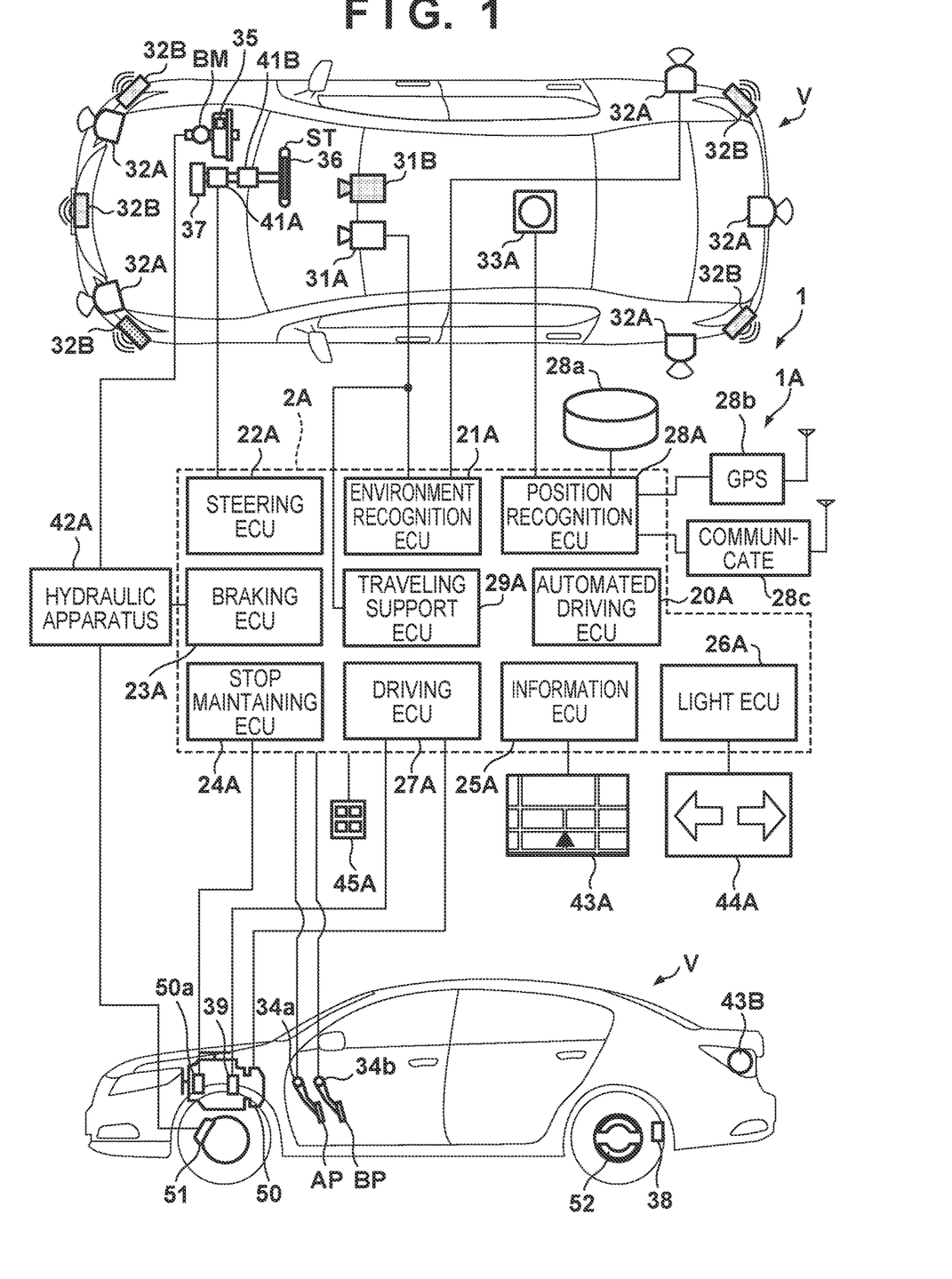
FIG. 1 is a block diagram of a vehicle control system according to an embodiment.
Figure 2:
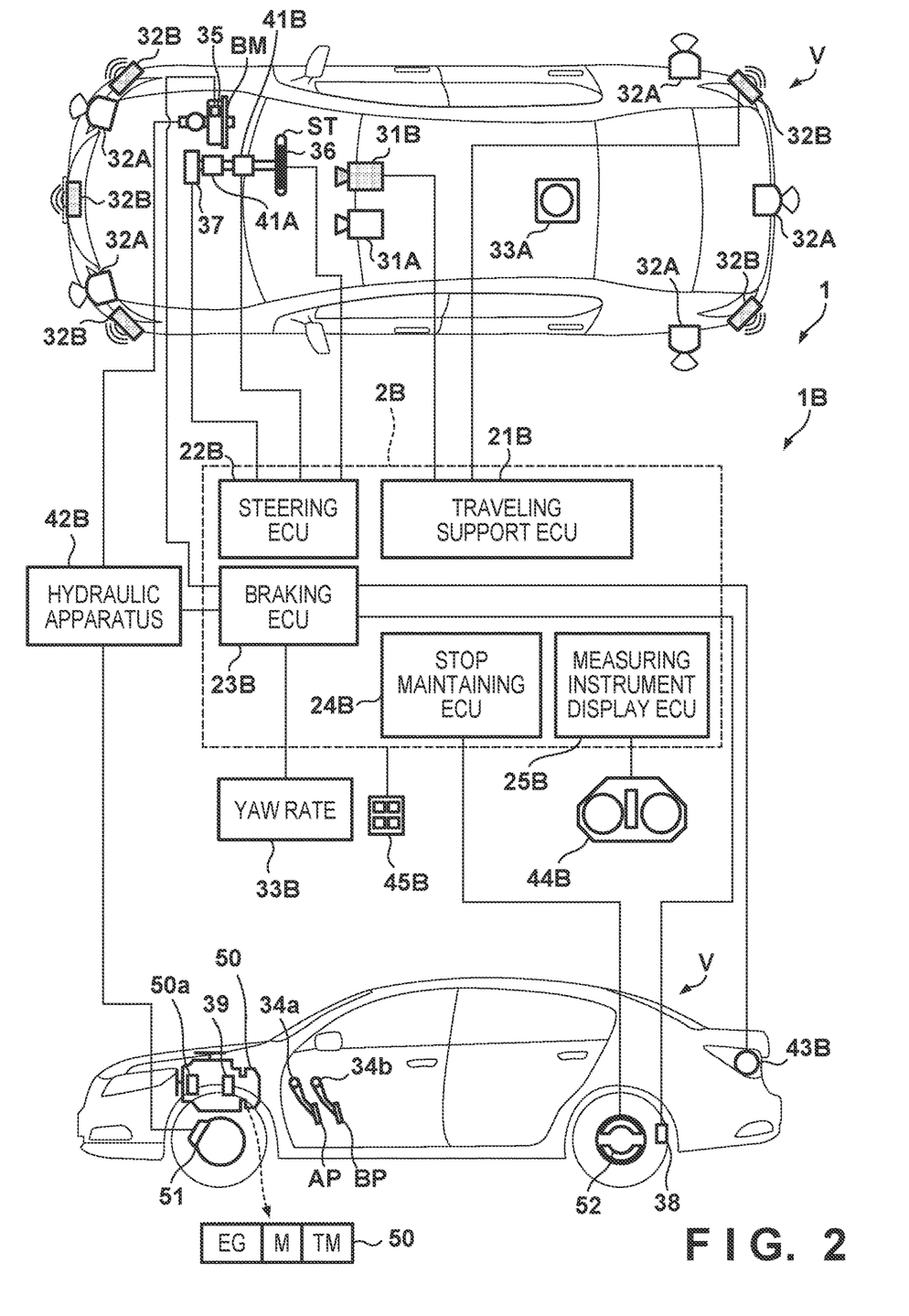
FIG. 2 is a block diagram of the vehicle control system according to the embodiment.
Figure 3:
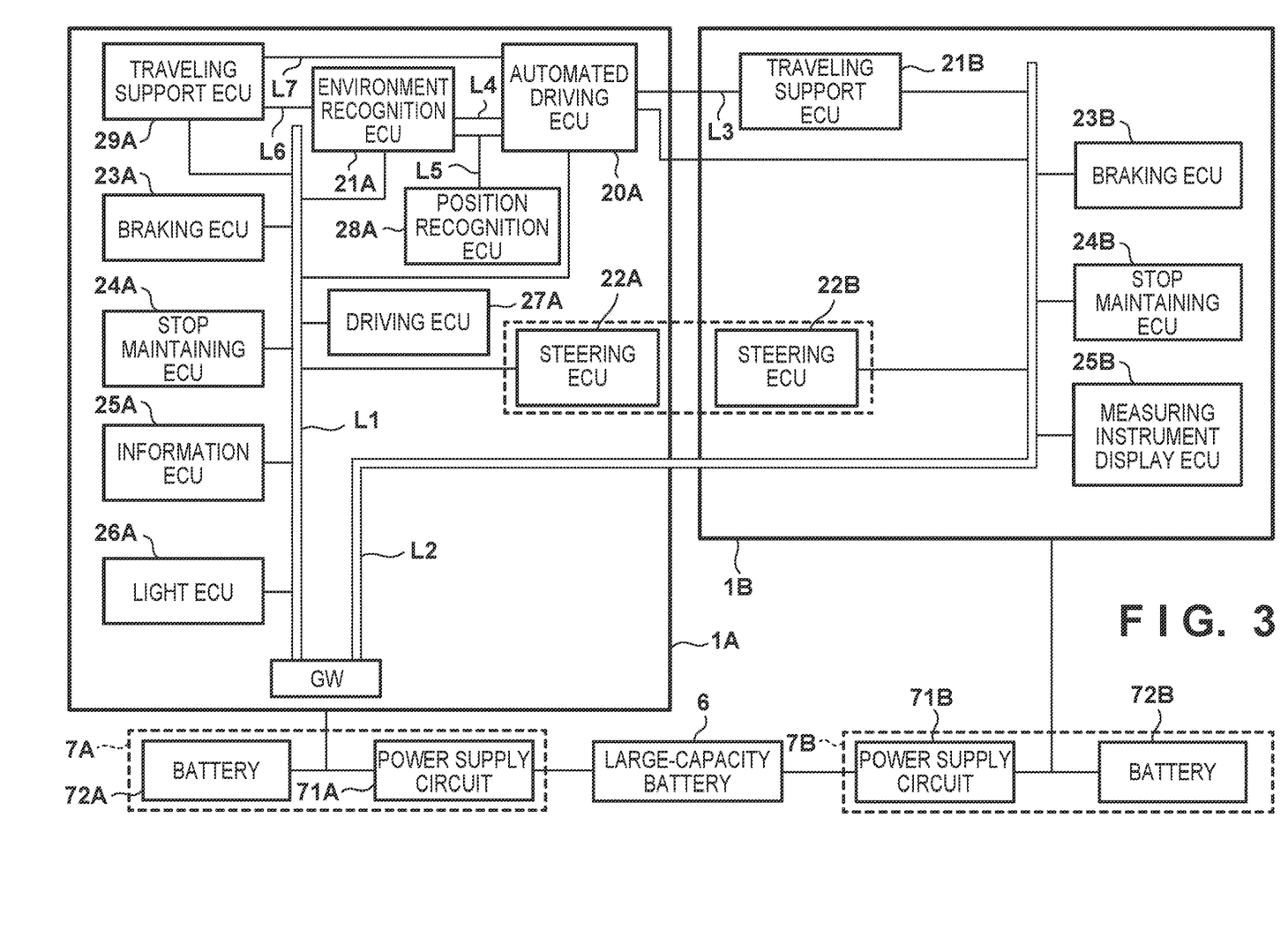
FIG. 3 is a block diagram of the vehicle control system according to the embodiment.

FIG. 1 to FIG. 4 are block diagrams of a vehicle control system 1 according to one embodiment of the present invention. The control system 1 controls a vehicle V. In FIG. 1 and FIG. 2, the outline of the vehicle V is illustrated in a plan view and a side view. As an example, the vehicle V is a sedan-type four-wheeled passenger car. The control system 1 includes a control apparatus 1A and a control apparatus 1B. FIG. 1 is the block diagram illustrating the control apparatus 1A, and FIG. 2 is the block diagram illustrating the control apparatus 1B. FIG. 3 mainly illustrates the communication line between the control apparatus 1A and the control apparatus 1B, and the configuration of a power source.

A part of functions achieved by the vehicle V are multiplexed or made redundant in the control apparatus 1A and the control apparatus 1B. Accordingly, the reliability of the system can be improved. The control apparatus 1A also performs traveling support control in connection with risk avoiding, etc., in addition to automated driving control, and usual operation control in manual driving, for example. The control apparatus 1B mainly administers the traveling support control in connection with risk avoiding, etc. The traveling support may be called driving support. It is possible to perform distribution of control processing and to improve reliability by making the control apparatus 1A and the control apparatus 1B redundant, and perform different control processing.

The vehicle V of the present embodiment is a parallel-type hybrid vehicle, and FIG. 2 schematically illustrates the configuration of a power plant 50 that outputs a driving force for rotating driving wheels of the vehicle V. The power plant 50 includes an internal combustion engine EG, a motor M, and an automatic transmission TM. The motor M can be utilized as a driving source for accelerating the vehicle V, and can also be utilized as an electric generator at the time of deceleration, etc. (regenerative braking).

<Control Apparatus 1A>

Referring to FIG. 1, the configuration of the control apparatus 1A will be described. The control apparatus 1A includes an ECU group (control unit group) 2A. The ECU group 2A includes a plurality of ECUs 20A to 29A. Each ECU includes a processor represented by a CPU, a storage device such as a semiconductor memory, an interface with an external device, etc. The storage device stores a program executed by the processor, data used by the processor for processing, etc. Each ECU may include a plurality of processors, storage devices, interfaces, etc. Note that the number of the ECUs and the functions to be handled can be properly designed, and these can be more subdivided or integrated than in the present embodiment. Further, in FIG. 1 and FIG. 3, typical function names are assigned to the ECU 20A to 29A. For example, the ECU 20A is shown as "automated driving ECU".

The ECU 20A performs control in connection with automated driving as traveling control of the vehicle V. In automated driving, at least one of driving (acceleration of the vehicle V by the power plant 50, etc.), steering and/or braking of the vehicle V is automatically performed, without depending on a driver's operation. In the present embodiment, driving, steering, and braking are automatically performed.

The ECU 21A is an environment recognition unit that recognizes the traveling environment of the vehicle V, based on detection results of detection units 31A and 32A that detect the surrounding conditions of the vehicle V. The ECU 21A generates target data, which will be described later, as peripheral environment information.

In the case of the present embodiment, the detection unit 31A is an imaging device (hereinafter may be denoted as the camera 31A) that detects an object around the vehicle V by imaging. The camera 31A is provided in a front portion of a roof of the vehicle V, so as to be able to image the front of the vehicle V. By analyzing of the image imaged by the camera 31A, it is possible to extract the outline of a target, and to extract the compartment lines (white lines, etc.) of lanes on a road.

In the case of the present embodiment, the detection unit 32A is a lidar (Light Detection and Ranging) (hereinafter may be denoted as the lidar 32A) that detects an object around the vehicle V by light, detects a target around the vehicle V, and measures the distance to the target. In the case of the present embodiment, five lidars 32A are provided: one in each corner of a front portion of the vehicle V; one in the middle of a rear portion; and one in each side of the rear portion. The number and arrangement of the lidars 32A can be properly selected.

The ECU 29A is a traveling support unit that performs control in connection with traveling support (in other words, driving support) as traveling control of the vehicle V, based on the detection result of the detection unit 31A.

The ECU 22A is a steering control unit that controls an electric power steering apparatus 41A. The electric power steering apparatus 41A includes a mechanism that steers front wheels according to the driver's operation (steering operation) with respect to a steering wheel ST. The electric power steering apparatus 41A assists the steering operation, and includes a motor that exhibits the driving force for automatically steering the front wheels, a sensor that detects the rotation amount of the motor, a torque sensor that detects the steering torque to be exerted on the driver, etc.

The ECU 23A is a braking control unit that controls a hydraulic apparatus 42A. The hydraulic apparatus 42A achieves, for example, ESB (electric servo brake). The braking operation by the driver with respect to a brake pedal BP is converted into hydraulic pressure in a brake master cylinder BM, and is transmitted to the hydraulic apparatus 42A. The hydraulic apparatus 42A is an actuator that can control the hydraulic pressure of a working fluid to be supplied to a brake apparatus (for example, a disc brake apparatus) 51 provided for each of four wheels, based on the hydraulic pressure transmitted from the brake master cylinder BM, and the ECU 23A performs drive control of an electromagnetic valve provided in the hydraulic apparatus 42A, etc. In the case of the present embodiment, the ECU 23A and the hydraulic apparatus 42A constitute the electric servo brake, and the ECU 23A controls, for example, the distribution of the braking force by the four brake apparatuses 51, and the braking force by regenerative braking of the motor M.

The ECU 24A is a stop maintaining control unit that controls an electric parking lock apparatus 50a provided in the automatic transmission TM. The electric parking lock apparatus 50a includes a mechanism that locks an internal mechanism of the automatic transmission TM mainly at the time of selection of a P range (parking range). The ECU 24A can control locking and unlocking by the electric parking lock apparatus 50a.

The ECU 25A is an in-vehicle report control unit that controls an information output apparatus 43A for reporting information inside the vehicle. The information output apparatus 43A includes, for example, a display apparatus such as a head-up display, and an audio output apparatus. Further, a vibration apparatus may be included. The ECU 25A causes the information output apparatus 43A to output, for example, various kinds of information such as the vehicle speed and the outside temperature, and information of course guidance, etc.

The ECU 26A is an outside-vehicle report control unit that controls an information output apparatus 44A for reporting information to the outside of the vehicle. In the case of the present embodiment, the information output apparatus 44A is a direction indicator (hazard lamp), and the ECU 26A can report the moving direction of the vehicle V to the outside of the vehicle by performing blinking control of the information output apparatus 44A as the direction indicator, and can enhance the attention toward the vehicle V from the outside of the vehicle by performing blinking control of the information output apparatus 44A as the hazard lamp.

The ECU 27A is a drive control unit that controls the power plant 50. In the present embodiment, although one ECU 27A is assigned to the power plant 50, one ECU may be assigned to each of the internal combustion engine EG, the motor M, and the automatic transmission TM. The ECU 27A controls the output of the internal combustion engine EG and the motor M, and switches the gear range of the automatic transmission TM, corresponding to, for example, the driver's operation detected by an operation detection sensor 34a provided in an accelerator pedal AP, and an operation detection sensor 34b provided in a brake pedal BP, the vehicle speed, etc. Note that a rotation frequency sensor 39 that detects the rotation frequency of an output shaft of the automatic transmission TM is provided in the automatic transmission TM as a sensor that detects the traveling state of the vehicle V. The vehicle speed of the vehicle V can be calculated from the detection result of the rotation frequency sensor 39.

The ECU 28A is a position recognition unit that recognizes the current position and course of the vehicle V. The ECU 28A performs control and information processing of the detection results or communication results of a gyro sensor 33A, a GPS sensor 28b, and a communication apparatus 28c. The gyro sensor 33A detects the rotary motion of the vehicle V. The course of the vehicle V can be determined from the detection result of the gyro sensor 33A, etc. The GPS sensor 28b detects the current position of the vehicle V. The communication apparatus 28c performs wireless communication with a server providing map information and traffic information, and obtains these kinds of information. A database 28a can store highly accurate map information, and the ECU 28A can specify the position of the vehicle V on a lane with a higher degree of accuracy, based on this map information, etc.

An input apparatus 45A is arranged inside the vehicle so as to be able to be operated by the driver, and receives instructions from the driver, and the input of information.

<Control Apparatus 1B>

Referring to FIG. 2, the configuration of the control apparatus 1B will be described. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, etc. The storage device stores a program executed by the processor, data used by the processor for processing, etc. Each ECU may include a plurality of processors, storage devices, interfaces, etc. Note that the number of the ECUs and the functions to be handled can be properly designed, and these can be more subdivided or integrated than in the present embodiment. Further, similar to the ECU group 2A, in FIG. 2 and FIG. 3, typical function names are assigned to the ECU 21B to 25B.

The ECU 21B is an environment recognition unit that recognizes the traveling environment of the vehicle V, based on the detection results of the detection units 31B and 32B that detect the surrounding conditions of the vehicle V, and is also a traveling support unit that performs control in connection with traveling support (in other words, driving support) as traveling control of the vehicle V. The ECU 21B generates target data, which will be described later, as peripheral environment information.

Note that, although the ECU 21B has the configuration including an environment recognition function and a traveling support function in the present embodiment, an ECU may be provided for each of the functions, such as the ECU 21A and the ECU 29A of the control apparatus 1A. Conversely, in the control apparatus 1A, one ECU may achieve the functions of the ECU 21A and the ECU 29A, such as the ECU 21B.

In the case of the present embodiment, the detection unit 31B is an imaging device (hereinafter may be denoted as the camera 31B) that detects an object around the vehicle V by imaging. The camera 31B is provided in the front portion of the roof of the vehicle V, so as to be able to image the front of the vehicle V. By analyzing of the image imaged by the camera 31B, it is possible to extract the outline of a target, and to extract the compartment lines (white lines, etc.) of lanes on a road. In the case of the present embodiment, the detection unit 32B is a millimeter wave radar that detects the object around the vehicle V by an electric wave (hereinafter may be denoted as the radar 32B), detects the target around the vehicle V, and measures the distance to the target. In the case of the present embodiment, five radars 32B are provided: one in the middle of the front portion of the vehicle V; one in each corner of the front portion; and one in each corner of the rear portion. The number and arrangement of the radars 32B can be properly selected.

The ECU 22B is a steering control unit that controls an electric power steering apparatus 41B. The electric power steering apparatus 41B includes a mechanism that steers the front wheels according to the driver's operation (steering operation) with respect to the steering wheel ST. The electric power steering apparatus 41B assists the steering operation, and includes a motor that exhibits the driving force for automatically steering the front wheels, a sensor that detects the rotation amount of the motor, a torque sensor that detects the steering torque to be exerted on the driver, etc. Additionally, a steering angle sensor 37 is electrically connected to the ECU 22B via a communication line L2 described later, and can control the electric power steering apparatus 41B based on the detection result of the steering angle sensor 37. The ECU 22B can obtain the detection result of a sensor 36 that detects whether or not the driver is gripping the steering handle ST, and can monitor the driver's gripping condition.

The ECU 23B is a braking control unit that controls a hydraulic apparatus 42B. The hydraulic apparatus 42B achieves, for example, VSA (Vehicle Stability Assist). The braking operation by the driver with respect to the brake pedal BP is converted into hydraulic pressure in the brake master cylinder BM, and is transmitted to the hydraulic apparatus 42B. The hydraulic apparatus 42B is an actuator that can control the hydraulic pressure of the working fluid to be supplied to the brake apparatus 51 for each wheel, based on the hydraulic pressure transmitted from the brake master cylinder BM, and the ECU 23B performs drive control of an electromagnetic valve provided in the hydraulic apparatus 42B, etc.

In the case of the present embodiment, the ECU 23B and the hydraulic apparatus 42B are electrically connected to a wheel speed sensor 38 provided in each of the four wheels, a yaw rate sensor 33B, and a pressure sensor 35 that detects the pressure in the brake master cylinder BM, and based on the detection results of these, an ABS function, traction control and the posture control function of the vehicle V are achieved. For example, the ECU 23B adjusts the braking force of each of the wheels based on the detection result of the wheel speed sensor 38 provided in each of the four wheels, and suppresses sliding of each of the wheels. Additionally, the braking force of each wheel is adjusted based on the rotation angular speed about a vertical axis of the vehicle V detected by the yaw rate sensor 33B, and the rapid posture change of the vehicle V is suppressed.

Additionally, the ECU 23B also functions as an outside-vehicle report control unit that controls an information output apparatus 43B that reports information to the outside of the vehicle. In the case of the present embodiment, the information output apparatus 43B is a brake light, and the ECU 23B can turn on the brake light at the time of braking, etc. Accordingly, the attention toward the vehicle V from the following vehicle can be enhanced.

The ECU 24B is a stop maintaining control unit that controls electric parking brake apparatuses (for example, drum brakes) 52 provided in the rear wheels. The electric parking brake apparatus 52 includes a mechanism for locking the rear wheel. The ECU 24B can control locking and unlocking of the rear wheels by the electric parking brake apparatuses 52.

The ECU 25B is an in-vehicle report control unit that controls an information output apparatus 44B that reports information inside the vehicle. In the case of the present embodiment, the information output apparatus 44B includes a display apparatus arranged in an instrument panel. The ECU 25B can cause the information output apparatus 44B to output various kinds of information, such as the vehicle speed, the fuel consumption, etc.

An input apparatus 45B is arranged inside the vehicle so as to be able to be operated by the driver, and receives instructions from the driver, and the input of information.

<Communication Lines>

Referring to FIG. 3, a description will be given of an example of communication lines of the control system 1 communicatively connecting the ECUs to each other. The control system 1 includes wired communication lines L1 to L7. Each of the ECU 20A to 27A and 29A of the control apparatus 1A is connected to the communication line L1. Note that the ECU 28A may also be connected to the communication line L1.

Each of the ECU 21B to 25B of the control apparatus 1B is connected to the communication line L2. Additionally, the ECU 20A of the control apparatus 1A is also connected to the communication line L2. The communication line L3 connects the ECU 20A and the ECU 21B to each other. The communication line L4 connects the ECU 20A and the ECU 21A to each other. The communication line L5 connects the ECU 20A, the ECU 21A, and the ECU 28A to each other. The communication line L6 connects the ECU 29A and the ECU 21A to each other. The communication line L7 connects the ECU 29A and the ECU 20A to each other.

Although the protocols of the communication lines L1 to L7 may be the same or may be different, the protocols may be different according to the communication environment, such as communication speed, traffic, and durability. For example, the communication lines L3 and L4 may be an Ethernet (registered trademark) in terms of communication speed. For example, the communication lines L1, L2 and L5 to L7 may be a CAN.

The control apparatus 1A includes a Gateway GW. The gateway GW relays the communication line L1 to the communication line L2. Therefore, for example, the ECU 21B can output a control command to the ECU 27A via the communication line L2, the gateway GW, and the communication line L1.

<Power Source>

Referring to FIG. 3, the power source of the control system 1 will be described. The control system 1 includes a large-capacity battery 6, a power source 7A, and a power source 7B. The large-capacity battery 6 is a battery for driving the motor M, and is the battery charged by the motor M.

The power source 7A is a power source that supplies electric power to the control apparatus 1A, and includes a power supply circuit 71A and a battery 72A. The power supply circuit 71A is a circuit that supplies electric power of the large-capacity battery 6 to the control apparatus 1A, and reduces, for example, the output voltage (for example, 190 V) of the large-capacity battery 6 to a reference voltage (for example, 12 V). The battery 72A is, for example, a lead battery of 12 V. By providing the battery 72A, even when the power supply of the large-capacity battery 6 and the power supply circuit 71A is cut off or decreased, electric power can be supplied to the control apparatus 1A.

The power source 7B is a power source that supplies electric power to the control apparatus 1B, and includes a power supply circuit 71B and a battery 72B. The power supply circuit 71B is a circuit similar to the power supply circuit 71A, and is a circuit that supplies electric power of the large-capacity battery 6 to the control apparatus 1B. The battery 72B is a battery similar to the battery 72A, and is, for example, a lead battery of 12 V. By providing the battery 72B, even when the power supply of the large-capacity battery 6 and the power supply circuit 71B is cut off or decreased, electric power can be supplied to the control apparatus 1B.

<General Configuration>

Figure 4:
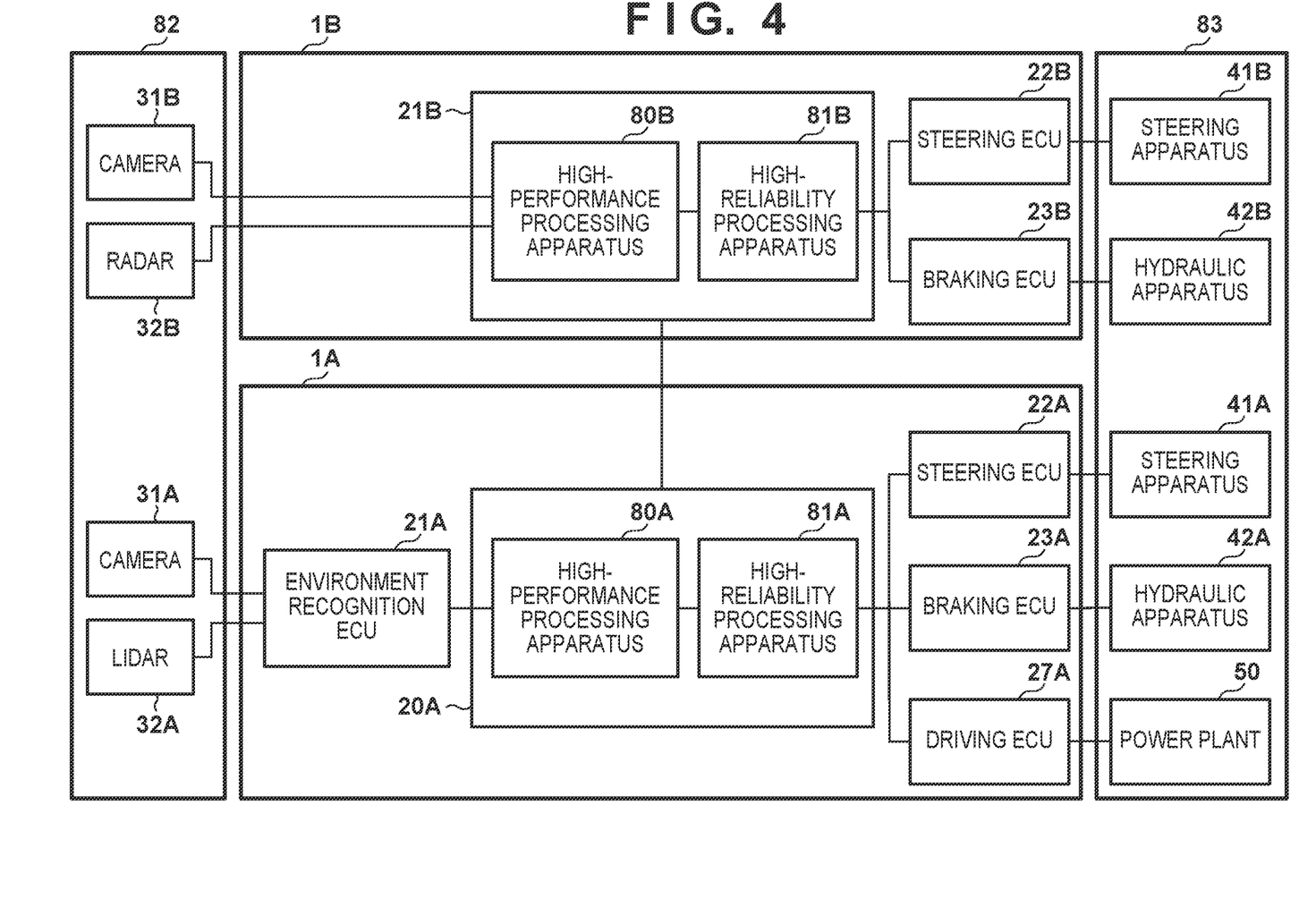
FIG. 4 is a block diagram of the vehicle control system according to the embodiment.

Referring to FIG. 4, the general configuration of the vehicle V will be described from another viewpoint. The vehicle V includes the control apparatus 1A, the control apparatus 1B, an external world recognition apparatus group 82, and an actuator group 83.

The external world recognition apparatus group 82 is a collection of external world recognition apparatuses (sensors) mounted in the vehicle V. The external world recognition apparatus group 82 includes the above-described camera 31A, camera 31B, lidar 32A, and radar 32B. The camera 31A and the lidar 32A are connected to the ECU 20A via the ECU 21A. External world information obtained by the camera 31A and the lidar 32A, and diagnostic information regarding these apparatuses are supplied to the ECU 20A, and the camera 31A and the lidar 32A are operated according to instructions from the ECU 20A. The camera 31B and the radar 32B are connected to the ECU 21B. External world information obtained by the camera 31B and the radar 32B, and diagnostic information regarding these apparatuses are supplied to the ECU 21B, and the camera 31B and the radar 32B are operated according to instructions from the ECU 21B. The ECU 21B may supply the external world information obtained by the camera 31B and the radar 32B to the ECU 20A. Accordingly, the ECU 20A can perform control of automated driving by using the external world information obtained from each of the camera 31A, the camera 31B, the lidar 32A, and the radar 32B.

The actuator group 83 is a collection of actuators mounted in the vehicle V. The actuator group 83 includes the above-described electric power steering apparatus 41A, electric power steering apparatus 41B, hydraulic apparatus 42A, hydraulic apparatus 42B, and power plant 50. The electric power steering apparatus 41A, the hydraulic apparatus 42A and the power plant 50 are connected to the ECU 20A via the ECU 22A, the ECU 23A, and the ECU 27A. Instead of this, the ECU 20A may be connected to only a part of the electric power steering apparatus 41A, the hydraulic apparatus 42A and the power plants 50. The diagnostic information regarding the electric power steering apparatus 41A, the hydraulic apparatus 42A and the power plant 50 is supplied to the ECU 20A, and the electric power steering apparatus 41A, the hydraulic apparatus 42A and the power plant 50 are operated according to instructions from the ECU 20A. The electric power steering apparatus 41B and the hydraulic apparatus 42B are connected to the ECU 21B via the ECU 23B and the ECU 22B. Instead of this, the ECU 21B may be connected to only a part of the electric power steering apparatuses 41B and the hydraulic apparatuses 42B. The diagnostic information regarding the electric power steering apparatus 41B and the hydraulic apparatus 42B is supplied to the ECU 21B, and the electric power steering apparatus 41B and the hydraulic apparatus 42B are operated according to instructions from the ECU 21B.

Since the power plant 50 performs driving of the vehicle V, the power plant 50 is a kind of a longitudinal control actuator. Further, since the power plant 50 can change the direction of the vehicle V by changing distribution of the driving force of the left and right wheels, the power plant 50 is also a kind of a lateral control actuator. Since each of the hydraulic apparatus 42A and the hydraulic apparatus 42B performs braking of the vehicle V, each of them is a kind of a longitudinal control actuator. Further, since each of the hydraulic apparatus 42A and the hydraulic apparatus 42B can change the direction of the vehicle V by braking torque vectoring, each of them is also a kind of a lateral control actuator. Since each of the electric power steering apparatus 41A and the electric power steering apparatus 41B controls steering of the vehicle V, each of them is a kind of a lateral control actuator.

The ECU 20A communicates with a part of the external world recognition apparatus group 82 (the camera 31A and the lidar 32A) through communication channels to obtain information from these, and communicates with a part of the actuator group 83 (the electric power steering apparatus 41A, the hydraulic apparatus 42A, and the power plant 50) through other communication channels. The ECU 21B communicates with a part of the external world recognition apparatus group 82 (the camera 31B and the radar 32B) through communication channels to obtain information from these, and communicates with a part of the actuator group 83 (the electric power steering apparatus 41B, and the hydraulic apparatus 42B) through other communication channels. The communication channel connected to the ECU 20A and the communication channel connected to the ECU 21B may be different from each other. Although these communication channels are, for example, a CAN (controller area network), these communication channels may be an Ethernet (registered trademark). Additionally, the ECU 20A and the ECU 21B are connected to each other through a communication channel. Although this communication channel is, for example, a CAN (controller area network), this communication channel may be an Ethernet (registered trademark). Additionally, it may be connected to both a CAN and an Ethernet (registered trademark).

The ECU 20A includes a high-performance processing apparatus 80A and a high-reliability processing apparatus 81A. Each of the high-performance processing apparatus 80A and the high-reliability processing apparatus 81A is constituted by a processor such as a CPU, and a memory such as RAM. The processing performance of the high-performance processing apparatus 80A is higher than the processing performance of the high-reliability processing apparatus 81A. The performance of the processing apparatuses is compared by, for example, clock frequencies and benchmark test results. The reliability of the high-reliability processing apparatus 81A is higher than the reliability of the high-performance processing apparatus 80A. For example, in the evaluation standard of the fault occurrence rate of the processing apparatus, the high-reliability processing apparatus 81A has a higher reliability than the high-performance processing apparatus 80A.

The high-performance processing apparatus 80A receives an input (for example, the external world information and the diagnostic information) from the external world recognition apparatus group 82, generates a trajectory to be followed by the vehicle V during automated driving, based on this input, and supplies this trajectory to the high-reliability processing apparatus 81A. The high-reliability processing apparatus 81A determines the manipulated variable of each actuator for achieving this trajectory, generates instructions to the actuator group 83, and supplies the instructions to the ECUs that controls the respective actuators.

The high-reliability processing apparatus 81A also functions as a monitoring unit that monitors the communication states of the communication channels to the external world recognition apparatus group 82, and the communication states of the communication channels to the actuator group 83. The communication states include the result of self-diagnosis by a connection destination apparatus, and the state in which communication cannot be performed with the connection destination apparatus. Based on these communication states, the high-reliability processing apparatus 81A can detect the functional deterioration regarding the vehicle V. That is, the high-reliability processing apparatus 81A can detect the functional deterioration regarding the actuators and the external world recognition apparatuses that are connected to the ECU 20A. The high-reliability processing apparatus 81A may further monitor the communication state between the ECU 21B and the external world recognition apparatus connected to the ECU 21B. In this case, the high-reliability processing apparatus 81A can detect the functional deterioration regarding the external world recognition apparatus connected to the ECU 21B.

The high-reliability processing apparatus 81A also functions as a control unit that performs substitution control during automated driving. The substitution control is control performed in a case where it is determined that switching from automated driving to manual driving is required, and is control substituting for control in the usual automated driving. In this substitution control, the high-reliability processing apparatus 81A controls traveling of the vehicle V by using the actuators (the electric power steering apparatus 41A, the hydraulic apparatus 42A, and the power plant 50) connected to the high-reliability processing apparatus 81A, based on information obtained by the ECU 20A from the camera 31A and the lidar 32A (detected information from these sensors). Specifically, the high-reliability processing apparatus 81A performs reporting for requiring the driver of the vehicle V to switch to manual driving, while maintaining automated-driving running. When there is no reaction to this report for a certain period of time (for example, 4 seconds or 15 seconds), the high-reliability processing apparatus 81A searches for a position where the vehicle V can stop, while decelerating the vehicle V. When the position where the vehicle V can stop can be found, the high-reliability processing apparatus 81A causes the vehicle V to stop there, and when the position where the vehicle V can stop cannot be found, the high-reliability processing apparatus 81A searches for a position where the vehicle V can stop, while causing the vehicle V to travel at a very low speed (for example, creep speed). Thereafter, the high-reliability processing apparatus 81A determines whether the vehicle V is stopped from the detection result of the rotation frequency sensor 39, and upon determination that the vehicle V is stopped, the high-reliability processing apparatus 81A maintains stoppage of the vehicle V. When the communication channel connecting the external world recognition apparatus group 82 and the ECU 21B to each other is operating normally, the high-reliability processing apparatus 81A may perform the substitution control based on information obtained by the ECU 20A from the camera 31A and the lidar 32A, and information obtained by the ECU 21B from the radar 32B. In this manner, the accuracy of the substitution control is improved by further utilizing the information from the radar 32B. Additionally, the high-reliability processing apparatus 81A may not use the information from the camera 31B. Since the high-reliability processing apparatus 81A has the information from the camera 31A, most of the information from the camera 31B overlaps with the information from the camera 31A. The amount of communication data can be reduced by not utilizing such overlapping information.

Similar to the ECU 20A, the ECU 21B also includes a high-performance processing apparatus 80B and a high-reliability processing apparatus 81B. The processing performance of the high-performance processing apparatus 80B is higher than the processing performance of the high-reliability processing apparatus 81B. The reliability of the high-reliability processing apparatus 81B is higher than the reliability of the high-performance processing apparatus 80B. The high-reliability processing apparatus 81B satisfies, for example, the ASIL D, and the high-performance processing apparatus 80B satisfies, for example, the ASIL B.

The high-performance processing apparatus 80B receives an input (for example, the external world information and the diagnostic information) from the external world recognition apparatus group 82, determines support content for travelling of the vehicle V during manual driving based on this input, and supplies this content to the high-reliability processing apparatus 81B. The high-reliability processing apparatus 81B determines the manipulated variable of each actuator for achieving this support, generates instructions to the actuator group 83, and supplies them to the ECUs that controls the respective actuators.

The high-reliability processing apparatus 81B also functions as a monitoring unit that monitors the communication states of the communication channels to the external world recognition apparatus group 82, and the communication states of the communication channels to the actuator group 83. The high-reliability processing apparatus 81B can detect the functional deterioration regarding the vehicle V based on these communication states. That is, the high-reliability processing apparatus 81B can detect the functional deterioration regarding the actuators and external world recognition apparatuses that are connected to the ECU 21B.

The high-reliability processing apparatus 81B also functions as a control unit that performs the substitution control during automated driving. In this substitution control, the high-reliability processing apparatus 81B performs control of travelling of the vehicle V by using the actuators (the electric power steering apparatus 41B, and the hydraulic apparatus 42B) connected to the high-reliability processing apparatus 81B, based on information obtained from the camera 31B and the radar 32B (detected information from these sensors). In this manner, in the present embodiment, both the high-reliability processing apparatus 81A of the ECU 20A and the high-reliability processing apparatus 81B of the ECU 21B function as the monitoring units and the control units that perform the substitution control. Therefore, high redundancy is achieved.

<Example of Control>
A description will be given of a control method of the vehicle V by the ECU 20A and the ECU 21B during automated driving. First, it is assumed that the high-reliability processing apparatus 81A of the ECU 20A has detected the functional deterioration regarding the vehicle V based on the communication states during monitoring. In this case, the high-reliability processing apparatus 81A notifies the high-reliability processing apparatus 81B that the functional deterioration regarding the vehicle V has been detected. In response to this notification, the high-reliability processing apparatus 81B performs the substitution control of the vehicle V. As described above, in the substitution control by the high-reliability processing apparatus 81B, travelling of the vehicle V is controlled by using the actuators connected to the ECU 21B, i.e., the electric power steering apparatus 41B and the hydraulic apparatus 42B. By performing the substitution control without using the actuators for which the functional deterioration has been detected, it is possible to control the vehicle V more safely.

Next, it is assumed that the high-reliability processing apparatus 81B of the ECU 21B has detected the functional deterioration regarding the vehicle V based on the communication states during monitoring. In this case, the high-reliability processing apparatus 81B notifies the high-reliability processing apparatus 81A that the functional deterioration regarding the vehicle V has been detected. In response to this notification, the high-reliability processing apparatus 81A performs the substitution control of the vehicle V. As described above, in the substitution control by the high-reliability processing apparatus 81A, travelling of the vehicle V is controlled by using the actuators connected to the ECU 20A, i.e., the electric power steering apparatus 41A, the hydraulic apparatus 42A, and the power plant 50. By performing the substitution control without using the actuators for which the functional deterioration has been detected, it is possible to control the vehicle V more safely.

During performance of the substitution control by the ECU 20A, the ECU 21B may monitor input information that is input to the ECU 20A, and output information that is output from the ECU 20A. The input information is, for example, information regarding the state of the vehicle V, the external world information, etc. The output information is, for example, an action plan, command values to the actuators, etc. The ECU 21B may suppress performance of the substitution control by the ECU 20A, based on these sets of input information and output information. For example, the ECU 21B compares the output information that is currently output with the past output information with respect to similar input information. When there is a great difference between these sets of output information, the ECU 21B may determine that the substitution control is not normally functioning, and may terminate the substitution control by the ECU 20A. By operating in this manner, the vehicle behavior can be prevented from being unstable due to the functional deterioration of the substitution control. Similarly, during performance of the substitution control by the ECU 21B, the ECU 20A may monitor input information that is input to the ECU 21B, and output information that is output from the ECU 21B, and may suppress performance of the substitution control by the ECU 21B, based on these sets of input information and output information.

Although, in the above-described embodiment, it has been described that the ECU 20A automatically performs all of driving, braking and steering as automated driving control in the automated-driving state, the automated driving control may control at least one of driving, braking and/or steering without the driver's driving operation. Controlling without the driver's driving operation can include controlling without an input by the driver with respect to an operator represented by a steering handle, a pedal, or can be said that the intention of the driver to drive the vehicle is not essential. Accordingly, automated driving control may be in the state where the driver has a surrounding monitoring duty, and at least one of driving, braking and/or steering of the vehicle V is controlled according to peripheral environment information of the vehicle V, may be in the state where the driver has the surrounding monitoring duty, and at least one of driving or braking, and/or steering of the vehicle V is controlled according to the peripheral environment information of the vehicle V, or may be in the state where the driver does not have the surrounding monitoring duty, and all of driving, braking and steering of the vehicle V are controlled according to the peripheral environment information of the vehicle V. Additionally, transition to each of these control stages can be made possible. In addition, a sensor that detects the driver's state information (biological information such as heart rate, state information such as expression and pupils) may be provided, and automated driving control may be performed, or may be suppressed according to the detection result of the sensor.

On the other hand, the driving support control (alternatively, traveling support control) performed by the ECU 29A and the ECU 21B may control at least one of driving, braking and/or steering during the driver's driving operation. During the driver's driving operation can be said as the case where there is an input by the driver with respect to an operator, or the case where the driver's contact to the operator can be confirmed, and the intention of the driver to drive the vehicle can be read. The driving support control can include both the driving support control performed by selecting activation of the driving support control through the driver's switch operation, and the driving support control performed without the driver's selection of activation of the driving support control. As for the former control, the activation of which is selected by the driver, preceding car tracking control, lane maintaining control, etc. can be listed. These can also be defined as a part of automated driving control. As for the latter control performed without the driver's selection of activation of the control, collision mitigation brake control, lane deviation suppression control, erroneous start suppression control, etc. can be listed.

Summary of Embodiments

[Configuration 1]

A control system (1) of a vehicle (V) including an external world recognition apparatus group (82) and an actuator group (83), the control system (1) comprising:

a first traveling control unit (20A) configured to perform first traveling control of the vehicle;

a second traveling control unit (21B) configured to perform second traveling control of the vehicle;

a first communication unit for the first traveling control unit to communicate with the external world recognition apparatus group;

a second communication unit for the first traveling control unit to communicate with the actuator group;

a third communication unit for the second traveling control unit to communicate with the external world recognition apparatus group; and a fourth communication unit for the second traveling control unit to communicate with the actuator group, wherein the first traveling control unit includes a first monitoring unit (81A) configured to monitor a communication state of the first communication unit and a communication state of the second communication unit, the second traveling control unit includes a second monitoring unit (81B) configured to monitor a communication state of the third communication unit and a communication state of the fourth communication unit, and when the first monitoring unit or the second monitoring unit detects functional deterioration of the vehicle based on the communication states during monitoring, at least one of the first traveling control unit and/or the second traveling control unit performs substitution control.

According to this configuration, since both the first traveling control unit and the second traveling control unit can detect the functional deterioration of the vehicle, and can perform the substitution, the redundancy of the vehicle is improved.

[Configuration 2]

The control system according to Configuration 1, wherein when the first monitoring unit detects the functional deterioration regarding the vehicle based on the communication states during monitoring, the second traveling control unit performs the substitution control, and when the second monitoring unit detects the functional deterioration regarding the vehicle based on the communication states during monitoring, the first traveling control unit performs the substitution control.

According to this configuration, the substitution control can be performed more safely by performing the substitution control by the traveling control unit other than the traveling control unit that has detected the functional deterioration.

[Configuration 3]

The control system according to Configuration 2, wherein when the third communication unit is operating normally, the first traveling control unit performs the substitution control based on information obtained by the first traveling control unit from the external world recognition apparatus group through the first communication unit, and information obtained by the second traveling control unit from the external world recognition apparatus group through the third communication unit.

According to this configuration, stable substitution control can be implemented by continuously utilizing the available external world recognition apparatus, when performing the substitution control.

[Configuration 4]

The control system according to Configuration 3, wherein the external world recognition apparatus group includes a first camera, a second camera, a lidar, and a radar, the first traveling control unit obtains information from the first camera and the lidar through the first communication unit, the second traveling control unit obtains information from the second camera and the radar through the third communication unit, and when the third communication unit is operating normally, the first traveling control unit performs the substitution control based on the information obtained by the first traveling control unit from the first camera and the lidar through the first communication unit, and the information obtained by the second traveling control unit from the radar through the third communication unit, and does not use the information from the second camera.

According to this configuration, stable substitution control can be implemented by continuously utilizing the radar, which is a sensor of a different type, while reducing the data communication amount by not utilizing a sensor of an overlapping type.

[Configuration 5]

The control system according to any one of Configurations 1 to 4, wherein the first monitoring unit further monitors the communication state of the third communication unit.

According to this configuration, both the two systems of external world recognition apparatuses can be monitored by one traveling control unit.

[Configuration 6]

The control system according to any one of Configurations 1 to 5, wherein the actuator group includes a first longitudinal control actuator (42A, 50), a second longitudinal control actuator (42B), a first lateral control actuator (41A, 42A, 50), and a second lateral control actuator (41B, 42B), the first traveling control unit is connected to at least one of the first longitudinal control actuator and/or the first lateral control actuator, and the second traveling control unit is connected to at least one of the second longitudinal control actuator and/or the second lateral control actuator.

According to this configuration, when the functional deterioration occurs in the actuator connected to one of the traveling control units, the substitution control can be performed by the actuator connected to the other traveling control units.

[Configuration 7]

The control system according to any one of Configurations 1 to 6, wherein the first traveling control unit includes a first processing apparatus (80A) configured to receive an input from the external world recognition apparatus group, and a second processing apparatus (81A) configured to generate an instruction to the actuator group, the second traveling control unit includes a third processing apparatus (80B) configured to receive an input from the external world recognition apparatus group, and a fourth processing apparatus (81B) configured to generate an instruction to the actuator group, the first monitoring unit is included in the second processing apparatus, and the second monitoring unit is included in the fourth processing apparatus.

According to this configuration, the functional deterioration can be detected in the processing apparatus that generates an instruction to the actuator group.

[Configuration 8]

The control system according to any one of Configurations 1 to 7, wherein the first monitoring unit notifies the second traveling control unit that the functional deterioration regarding the vehicle has been detected, and the second monitoring unit notifies the first traveling control unit that the functional deterioration regarding the vehicle has been detected.

According to this configuration, the functional deterioration can be notified to each other.

[Configuration 9]

The control system according to any one of Configurations 1 to 8, wherein the control system further includes a third monitoring unit configured to monitor, during performance of the substitution control by the first traveling control unit or the second traveling control unit, input information that is input to the traveling control unit that is performing the substitution control, and output information that is output from the traveling control unit that is performing the substitution control, and the third monitoring unit suppresses performance of the substitution control by the first traveling control unit or the second traveling control unit, based on the input information and the output information.

According to this configuration, by monitoring the input and output of the substitution control, the vehicle behavior can be prevented from being unstable due to the functional deterioration of the substitution control.

[Configuration 10]

The control system according to any one of Configurations 1 to 9, wherein at least one of the first traveling control unit and/or the second traveling control unit requests a driver of the vehicle for driving change before performing the substitution control, performs the substitution control when the driving change is not performed, and stops the vehicle in the substitution control.

According to this configuration, the vehicle can be shifted to a safe state.

[Configuration 11]

A vehicle (V) comprising:

the control system (1) according to any one of Configurations 1 to 10;

the external world recognition apparatus group (82); and the actuator group (83).

According to this configuration, the vehicle with improved redundancy is provided.

[Configuration 12]

A control method of a vehicle (V) including an external world recognition apparatus group (82) and an actuator group (83), the vehicle comprising:

a first traveling control unit (20A) configured to perform first traveling control of the vehicle;

a second traveling control unit (21B) configured to perform second traveling control of the vehicle;

a first communication unit for the first traveling control unit to communicate with the external world recognition apparatus group;

a second communication unit for the first traveling control unit to communicate with the actuator group;

a third communication unit for the second traveling control unit to communicate with the external world recognition apparatus group; and a fourth communication unit for the second traveling control unit to communicate with the actuator group, the control method comprising:

monitoring, by a first monitoring unit (81A) included in the first traveling control unit, a communication state of the first communication unit and a communication state of the second communication unit;

monitoring, by a second monitoring unit (81B) included in the second traveling control unit, a communication state of the third communication unit and a communication state of the fourth communication unit; and when the first monitoring unit or the second monitoring unit detects functional deterioration of the vehicle based on the communication states during monitoring, performing, by at least one of the first traveling control unit and/or the second traveling control unit, substitution control.

According to this configuration, since both the first traveling control unit and the second traveling control unit can detect the functional deterioration of the vehicle, and can perform the substitution control, the redundancy of the vehicle is improved.

The present invention is not limited to the above embodiments, and various changes and modifications can be made without departing from the spirit and scope of the present invention. Therefore, to apprise the public of the scope of the present invention, the following claims are attached.

The invention claimed is:

1. A control system of a vehicle including an external world recognition apparatus group and an actuator group, the control system comprising:

a first traveling control unit configured to perform first traveling control of the vehicle;

a second traveling control unit configured to perform second traveling control of the vehicle;

a first communication unit for the first traveling control unit to communicate with the external world recognition apparatus group;
a second communication unit for the first traveling control unit to communicate with the actuator group;
a third communication unit for the second traveling control unit to communicate with the external world recognition apparatus group; and
a fourth communication unit for the second traveling control unit to communicate with the actuator group, wherein
the first traveling control unit includes a first monitoring unit configured to monitor a communication state of the first communication unit and a communication state of the second communication unit,
the second traveling control unit includes a second monitoring unit configured to monitor a communication state of the third communication unit and a communication state of the fourth communication unit, and
when the first monitoring unit or the second monitoring unit detects functional deterioration of the vehicle based on the communication states during monitoring, at least one of the first traveling control unit and/or the second traveling control unit performs substitution control.

2. The control system according to claim 1, wherein
when the first monitoring unit detects the functional deterioration regarding the vehicle based on the communication states during monitoring, the second traveling control unit performs the substitution control, and
when the second monitoring unit detects the functional deterioration regarding the vehicle based on the communication states during monitoring, the first traveling control unit performs the substitution control.

3. The control system according to claim 2, wherein when the third communication unit is operating normally, the first traveling control unit performs the substitution control based on information obtained by the first traveling control unit from the external world recognition apparatus group through the first communication unit, and information obtained by the second traveling control unit from the external world recognition apparatus group through the third communication unit.

4. The control system according to claim 3, wherein
the external world recognition apparatus group includes a first camera, a second camera, a lidar, and a radar,
the first traveling control unit obtains information from the first camera and the lidar through the first communication unit,
the second traveling control unit obtains information from the second camera and the radar through the third communication unit, and
when the third communication unit is operating normally, the first traveling control unit performs the substitution control based on the information obtained by the first traveling control unit from the first camera and the lidar through the first communication unit, and the information obtained by the second traveling control unit from the radar through the third communication unit, and does not use the information from the second camera.

5. The control system according to claim 1, wherein the first monitoring unit further monitors the communication state of the third communication unit.

6. The control system according to claim 1, wherein the actuator group includes a first longitudinal control actuator, a second longitudinal control actuator, a first lateral control actuator, and a second lateral control actuator,
the first traveling control unit is connected to at least one of the first longitudinal control actuator and/or the first lateral control actuator, and
the second traveling control unit is connected to at least one of the second longitudinal control actuator and/or the second lateral control actuator.

7. The control system according to claim 1, wherein
the first traveling control unit includes a first processing apparatus configured to receive an input from the external world recognition apparatus group, and a second processing apparatus configured to generate an instruction to the actuator group,
the second traveling control unit includes a third processing apparatus configured to receive an input from the external world recognition apparatus group, and a fourth processing apparatus configured to generate an instruction to the actuator group,
the first monitoring unit is included in the second processing apparatus, and
the second monitoring unit is included in the fourth processing apparatus.

8. The control system according to claim 1, wherein
the first monitoring unit notifies the second traveling control unit that the functional deterioration regarding the vehicle has been detected, and
the second monitoring unit notifies the first traveling control unit that the functional deterioration regarding the vehicle has been detected.

9. The control system according to claim 1, wherein
the control system further includes a third monitoring unit configured to monitor, during performance of the substitution control by the first traveling control unit or the second traveling control unit, input information that is input to the traveling control unit that is performing the substitution control, and output information that is output from the traveling control unit that is performing the substitution control, and
the third monitoring unit suppresses performance of the substitution control by the first traveling control unit or the second traveling control unit, based on the input information and the output information.

10. The control system according to claim 1, wherein at least one of the first traveling control unit and/or the second traveling control unit requests a driver of the vehicle for driving change before performing the substitution control, performs the substitution control when the driving change is not performed, and stops the vehicle in the substitution control.

11. A vehicle comprising:
the control system according to claim 1;
the external world recognition apparatus group; and
the actuator group.

12. A control method of a vehicle including an external world recognition apparatus group and an actuator group, the vehicle comprising:
a first traveling control unit configured to perform first traveling control of the vehicle;
a second traveling control unit configured to perform second traveling control of the vehicle;
a first communication unit for the first traveling control unit to communicate with the external world recognition apparatus group;
a second communication unit for the first traveling control unit to communicate with the actuator group;
a third communication unit for the second traveling control unit to communicate with the external world recognition apparatus group; and a fourth communication unit for the second traveling control unit to communicate with the actuator group, the control method comprising:

monitoring, by a first monitoring unit included in the first traveling control unit, a communication state of the first communication unit and a communication state of the second communication unit;

monitoring, by a second monitoring unit included in the second traveling control unit, a communication state of the third communication unit and a communication state of the fourth communication unit; and when the first monitoring unit or the second monitoring unit detects functional deterioration of the vehicle based on the communication states during monitoring, performing, by at least one of the first traveling control unit and/or the second traveling control unit, substitution control.

\* \* \* \* \*